No. 773,910. PATENTED NOV. 1, 1904.
S. E. WEBBE.
SLIDE VALVE FOR FLUID PRESSURE ENGINES.
APPLICATION FILED APR. 28, 1902.
NO MODEL. 2 SHEETS—SHEET 1.
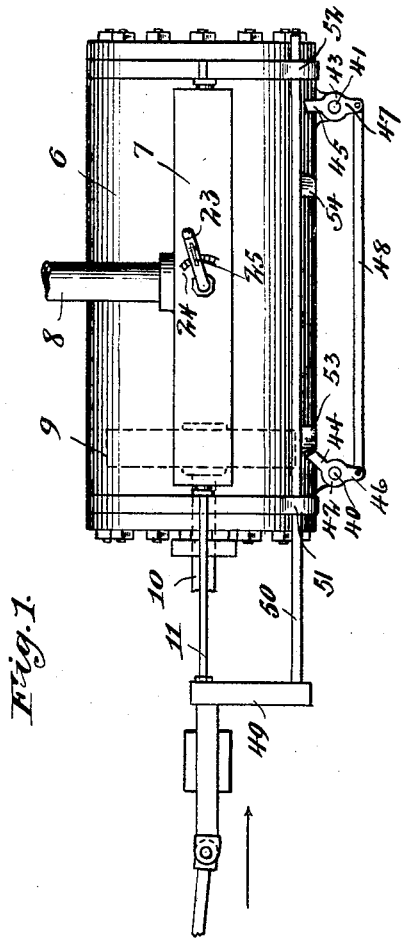
Witnesses,
Inventor,
Samuel E. Webbe,
By Offield, Towle & Linthicum
Attys.

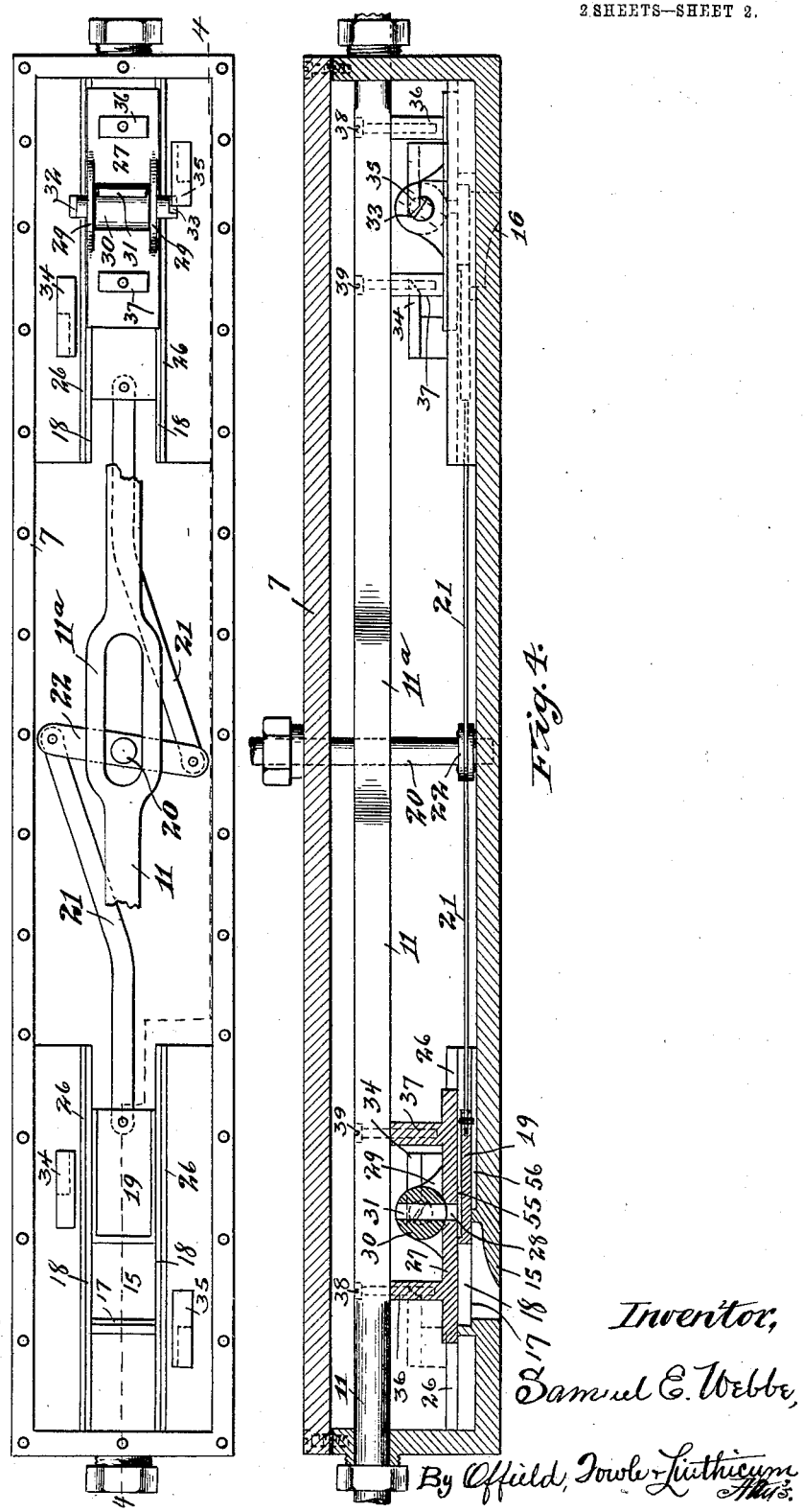

No. 773,910. Patented November 1, 1904.

UNITED STATES PATENT OFFICE.

SAMUEL E. WEBBE, OF CHICAGO, ILLINOIS.

SLIDE-VALVE FOR FLUID-PRESSURE ENGINES.

SPECIFICATION forming part of Letters Patent No. 773,910, dated November 1, 1904.

Application filed April 28, 1902. Serial No. 105,002. (No model.)

*To all whom it may concern:*

Be it known that I, SAMUEL E. WEBBE, a subject of the King of Great Britain, residing at Chicago, in the county of Cook and State of Illinois, have invented certain new and useful Improvements in Slide-Valves for Fluid-Pressure Engines, of which the following is a specification.

My invention relates to slide-valves for steam and other fluid pressure engines, and has for its object to provide a valve constructed and operated upon the mechanical principle of the well-known Corliss valve, but characterized by an arrangement of mechanism which is capable of application to motors that are operated by an expansive fluid under varying loads and speeds and wherein the operator can impart the desired regulations to the motor and always deliver the fluid at its initial pressure on the piston.

The distinctive principle of the Corliss valve as compared with previous known types of valves for controlling the passage of steam and like expansive fluids to a cylinder resides in its capacity to take advantage of the full expansive power of the steam by admitting at each stroke of the piston a given quantity of steam at full boiler-pressure (theoretically) to the cylinder, then suddenly cutting it off with a minimum wire-drawing effect, and allowing the steam to act expansively thereafter in the cylinder. A marked economy in the amount of steam used and consequent saving of fuel has resulted from this principle of operation; but this principle as embodied in the Corliss valve has, so far as I am aware, been limited to engines of the stationary type, wherein the demands of service upon the engine are comparatively constant or vary so slightly and gradually as to render the engine capable of automatic regulation through a governor-controlled cut-off. The peculiar and constantly-changing demands of service in connection with locomotives, automobiles, and similar types of engines have precluded hitherto the application of the Corliss valve-gear thereto, and so far as I am aware a successful mechanical embodiment of the Corliss principle in a slide-valve capable of application to and successful operation upon engines worked under varying loads and speeds, such as a locomotive, has never been produced. In my present invention I believe I have produced such a valve.

In the accompanying drawings, Figure 1 is a side elevational view of a steam-cylinder and valve mechanism therefor embodying my invention such as might be employed upon a locomotive or similar type of engine. Fig. 2 is an end view of the parts shown in Fig. 1 viewed in the direction indicated by the arrow. Fig. 3 is a top plan view of the steam-chest detached, the cover thereof being removed to disclose the contained valve mechanism, said valve mechanism being partly broken off at each end to better illustrate all the elements thereof. Fig. 4 is a longitudinal section through the casing of the steam-chest on the line 4 4 of Fig. 3 with parts omitted; and Fig. 5 is a longitudinal section through one end of a steam-chest and its contained valve mechanism, illustrating a modified form of the latter.

Referring first to Figs. 1, 2, 3, and 4, 6 designates an ordinary steam-cylinder—such, for instance, as employed upon a locomotive. 7 is the steam-chest, herein shown as applied to one side of the cylinder 6, and 8 is the steam-supply pipe leading from the boiler thereto. 9 indicates the usual piston, and 10 the piston-rod. 11 indicates the actuating-rod of the slide-valve contained within the steam-chest 7, this rod being actuated in the usual fashion from an eccentric 12 and eccentric-strap and pitman 13 and 14, respectively.

Referring now more particularly to Figs. 3 and 4, it will be observed that the steam-chest 7 communicates with the interior of the cylinder through a pair of rectangular ports 15 and 16, located at either end thereof, respectively. Above these ports are formed seats 17 and ways 18 for a pair of variable cut-off slides 19, which slides may be connected at their inner opposite ends to a central operating-shaft 20 through pitmen 21, connected to opposite ends of a rocker 22, centrally mounted fast on the shaft 20, which latter shaft extends through the cover of the steam-chest and outside the latter is provided with an actuating-arm 23, Figs 1 and 2, provided with a rack and detent 24 25, respectively, whereby the cut-off may be secured in any manually-adjusted position, it being understood that the arm 23 will be connected, through suitable lever-and-link connections, to an operating-lever within reach of the engineer. From the foregoing it will be seen that the turning of the shaft 20 in one direction or the other restricts or expands the area of that portion of the ports 15 and 16 which affords free communication between the steam-chest and the cylinder. Directly above the ways 18 of the cut-off slides 19 are a corresponding pair of ways 26, in and between which reciprocate a pair of valve-carriers, which in the form herein shown are constructed as follows: 27 designates the base-plate of the valve-carrier, which is provided with a transverse rectangular port 28, formed therethrough about centrally thereof, which port in the reciprocations of the valve-carrier is adapted to be carried back and forth through a distance somewhat greater than the longitudinal extent of the underlying port 15 or 16, leading to the cylinder. On the upper or outer face of the plate 27, on either side thereof, are a pair of uprights 29, in and between which is rotatably mounted the valve proper, this latter consisting of a cylindrical valve-body 30, through which is formed longitudinally and diametrically thereof a rectangular port 31 of the same longitudinal and lateral dimensions as the directly underlying port of the valve-plate, with which latter port 31 is adapted at times to register, as shown at the left-hand end of Fig. 4, it being observed that the cylindrical valve-body 30 has a seat in and upon the plate 27, directly over the port 28 of the latter. The journals of the valve 30 extend through the supports 29, as shown at the right-hand end of Fig. 3, and are provided at their extremities with flattened faces 32 and 33, adapted for coöperation with a pair of stationary cam-blocks 34 and 35, respectively located on opposite sides of the path of travel of the valve and adjacent the opposite limits of its reciprocations. On the upper or outer face of the valve-plate 27 are mounted a pair of posts 36 and 37, disposed on opposite sides of the oscillatory valve-body 30 and rising to a height slightly above the top of the latter. On top of the posts 36 and 37 of both valve-plates rests and is secured, as by screw-bolts 38 39 or any other convenient means, that portion of the valve-actuating rod 11 which lies within the steam-chest. It will be observed that the center of this inclosed portion of the valve-rod is looped, as shown at 11ª, to straddle the shaft 20 without interference with or from the latter in its reciprocations.

Referring to Figs. 1 and 2, I have therein illustrated a simple and convenient arrangement of exhaust-valves and controlling means therefor which may be employed in connection with my novel inlet-valve mechanism above described. In these figures, 40 and 41 designate a pair of exhaust-valves of the rotary oscillating type controlling exhaust-ports leading from the under side of the cylinder 6, at opposite ends thereof. At the outer ends of the stems of these valves and fast thereon are mounted levers 42 and 43, respectively, which levers have upwardly-extending tappets 44 and 45 and downwardly-extending arms 46 and 47, respectively, the arms being connected by a link or rod 48, whereby they are simultaneously and oppositely actuated—that is, the opening of one valve closes the other, and vice versa. Secured to and depending from the valve-actuating rod 11 at a suitable point intermediate the cylinder-head and the valve-actuating eccentric is an elbow-bracket 49, Fig. 2, to the outer end of the horizontal member of which is secured one end of a slide-rod 50, slidingly supported in lugs or keepers 51 and 52 at either end of the cylinder and in the vertical plane of the valve-actuating levers 42 and 43. On the under side of the rod 50 and at points lying between the exhaust-valves 40 and 41 are a pair of cam-shaped depending lugs 53 and 54, which are so situated relatively to each other and to the said valve-actuating levers as to alternately actuate the latter on the to-and-fro reciprocations of the rod 50, which latter of course occur simultaneously with the to-and-fro reciprocations of the main-valve-actuating rod 11.

Bearing in mind that the described valve constructions are identical at the opposite ends of the valve-chamber or steam-chest, but are so connected to their operating parts as to be at all times oppositely disposed with reference to the ports which they control, the operation is substantially as follows: Through the eccentric 12 a longitudinal reciprocating motion is imparted to the rod 11 in the manner well understood in connection with ordinary forms of steam-slide-valve mechanisms. The parts are shown in Figs. 3 and 4 as occupying the same relative positions, and in these views the valve-actuating rod 11 is represented as having nearly but not quite completed its travel from left to right. In these views it will be observed that the port 31 of the valve-body is in register with the port 28 of the base-plate of the valve-carrier at the left-hand end of the valve-chest, while the corresponding ports at the right-hand end are out of register. As now the rod 11 completes its travel to the right the impingement of the flat face 32 at the remote end of the valve-spindle with the oblique face of its coöperating cam-block 34 at the left-hand end of the valve-chest will impart a sudden partial rotation to the valve-body, sufficient to carry its port out of register with the port 28, and thus close the latter. Simultaneously the similar engagement of the flat face 33 on the inner end of the journal or spindle of the valve-body 30 with the oblique face of its coöperating cam-block 35 at the right-hand end of the valve-chamber will rock the port of the said valve-body into register with its companion port 28 in the base-plate of its valve-carrier. Thus when the rod 11 starts on its return or left-hand travel and during such travel steam will be admitted to the cylinder at the right-hand end thereof through the ports 31, 28, and 16, while steam will be cut off from the opposite end of the cylinder, owing to the fact that the ports 31 and 28 are out of register, and it is to be observed as constituting the preëminent feature of my invention that at all times during this entire travel of the valve-carrier and its registering valve over the cylinder inlet-port a quantity of steam at full boiler-pressure is being admitted to that end of the cylinder which is receiving steam, it being here remarked, by way of explanation, that the ports 31 and 28 will have a cross-sectional area and steam-admitting capacity somewhat less than the cross-sectional area and steam-admitting capacity of the cylinder inlet-ports 15 and 16, but sufficient to supply the cylinder at undiminished boiler-pressure under varying speeds and at all points of the piston travel, for which purpose the cross-sectional area of said ports will ordinarily be not less than the cross-sectional area of the steam-supply pipe from the boiler to the steam-chest. During this travel of the valve-rod from right to left the valve at the left-hand end will be closed and steam therefore cut off from that end of the cylinder. Just before the completion of the right-to-left travel of the valve-rod and after the valve at the left has nearly and the valve at the right completely passed over their respective ports 15 and 16 the near end of the valve-spindle at the left-hand end and the remote end of the valve-spindle at the right-hand end will engage their respective coöperating cam-blocks 35 and 34, whereby the oscillating valve-bodies 30 will be rocked into the positions shown in Fig. 4 relatively to their respective carriers—that is to say, the ports 31 and 28 will be in register at the left-hand end of the valve-chest and out of register at the right-hand end thereof, only both valves will be at the left-hand extreme of their travel. The purpose of opening the valve-port on that side which is to receive steam slightly in advance of the completion of the idle movement of the valve-carrier is to admit steam to the cylinder in time to check the momentum of the piston and afford the cushioning effect therefor, which is commonly practiced and well understood in this art. Hence when I refer to the port of the valve plate or carrier as maintained closed during the travel of said plate over the cylinder-port in one direction I mean that said port is maintained closed during all of said travel except the minute and practically negligible fraction thereof during which steam is admitted for the cushioning effect referred to. On the immediately-succeeding left-to-right movement of the valve-rod the valve at the left-hand end will admit a given volume of steam at full boiler-pressure to the left-hand end of the cylinder during the entire travel of the valve over the port 15, while steam will be cut off from the right-hand end of the cylinder, owing to the inoperative position of the inlet-valve at that end of the valve-chest. During the completion of this movement the parts will all assume the relative positions shown in Figs. 3 and 4, whereupon the above-described cycle of operations will be repeated. It will be readily understood that while steam is being admitted alternately to the opposite ends of the cylinder in the manner described it is being discharged simultaneously from the relatively opposite ends of the cylinder through the exhaust-valves 40 and 41, which are operated in properly-timed relation to the inlet-valves by the cam-lugs 53 and 54.

It will be observed in connection with the above-described operation of the inlet-valves that the cut-off slides 19 occupy positions over their respective ports 15 and 16 determined by the position of the arm 23, positively set by the engineer or by the operation of the governor when the shaft 20 is connected to and controlled by an automatic governor mechanism. In this way the actual longitudinal extent and area of the ports 15 and 16 is determined for any given time by the actual conditions of service and the existing pressure of steam or other motive agent, and thus the actual volume of steam admitted to the cylinder at each reciprocation of the connected valves is directly controlled.

In order to secure the proper balancing of the moving parts of the mechanism and fluid-tight joints between the coöperating surfaces, I provide steam-spaces 55 between the opposed proximate surfaces of the valve-carriers and underlying cut-off slides and similar spaces 56 between the corresponding surfaces of the latter and the inner or bottom wall of the valve-chamber.

Fig. 5 illustrates a modification of the construction and means and manner of operating the valve-body proper, but embodying the underlying principle of my invention. In this figure all of the several parts which are identical with the corresponding parts at the left-hand end of Figs. 3 and 4 have been identified by the same reference-numerals. Referring then to those parts which illustrate the modification, it will be observed that in place of the oscillating cylindrical valve-body 30, having a longitudinal port 31 formed therethrough, I employ simply a laterally-reciprocable valve-body in the form of a bar or narrow plate $30^a$, which is connected to the underlying valve-carrier 27 by a pair of links 57, these links being pivoted at their lower ends in the sides of the valve-carrier just inside the port 28 and at their upper ends having a pin-and-slot connection with the ends of the valve-plate 30ᵃ. By this means the valve-plate 30ᵃ is afforded a limited lateral reciprocatory movement sufficient to carry it alternately upon and off the port 28, and this travel is imparted to the valve-plate through a positive rigid connection of the latter with the valve-actuating rod 11, as by being set in the under side of said rod in the manner shown. It will be found that where this form of valve-body is employed the to-and-fro movements of the valve-actuating rod will effect substantially the same control of the ports 28 at the opposite ends of the valve-chest, as already described in connection with Figs. 3 and 4, it being necessary in order to cushion the piston only to give the eccentric 12 a slight "lead" over the engine-crank. It will be evident that still other means of effecting the described relative control of the ports 28 would occur to the skilled mechanic or engineer upon being made acquainted with my invention through the disclosure thereof already set out. My invention in its broad aspects, therefore, is not limited to any specific construction or any particular mode of operation of the means for controlling the ports 28 through the reciprocations of the valve-actuating rod so long as the full opening and closing of said ports during the travel of the latter over the cylinder-inlet ports for the purposes and with the advantages already described is secured.

From the foregoing it will be seen that my invention is based upon the generic principle of the Corliss inlet-valve in that it provides for the admission of a volume of steam at full initial pressure (theoretically) to the cylinder, the instantaneous cut-off thereof with a minimum wiredrawing effect, and the subsequent expansion of the volume of steam admitted throughout the remainder of the stroke. My invention, however, vastly extends the application and possibilities of the Corliss principle, since the Corliss valve has thus far been found capable of successful use only upon engines of the stationary and marine types having a comparatively low number of piston movements and in connection with a governor control to vary the amount of steam admitted by the time of closing of the valves themselves. My invention, on the contrary, is independent of the load and the speed of piston movement and is capable of application as well to locomotives, automobile-motors, and similar types of engines as to engines of the stationary type. My invention is also capable of use in connection with a positive controlling mechanism that is independent of either the extent of movement or the speed of travel of the valve itself and which may be operated automatically by a governor or directly by the engineer and which may also constitute a complete throttle in case the engine gets to racing. It will be seen that these last-mentioned results are secured by the employment of sliding cut-off plates preferably interposed between the cylinder-ports and the steam-inlet valves and serving to vary the areas of the cylinder inlet-ports, over which the inlet-valves travel, and which are entirely independent of the said inlet-valves. The contraction or expansion of the area of the cylinder inlet-ports obviously directly affects the interval of time through which steam is admitted to the cylinder, and thus proportionately affects the volume of steam admitted. I do not limit myself, except to the extent specified in certain of the claims hereunto appended, to the illustrated and described location of the sliding cut-offs 19 between the cylinder-ports and the valve-carriers, although I believe such location of the cut-offs to present the greatest mechanical advantages and the best results.

It will thus be seen that in a slide-valve constructed and operating on the principle hereinabove set forth there is never any throttling of the steam or other motive fluid, and therefore no loss from lack of proper expansion, providing the engine is not worked beyond its economical limit. Owing to the extremely rapid opening and closing of the traveling inlet-ports, the wiredrawing effect is reduced to a minimum and loss from this source is practically *nil*. The moving parts are all balanced to minimize friction and wear. No springs are employed, every movement being positively and directly effected, and no packing of the parts inside the valve-chest is required. My invention thus combines simplicity of construction and a high efficiency in operation, with a moderate cost of production, a wide range of utility, and a marked degree of economy in respect to the conversion of fuel into power.

I claim—

1. In a valve mechanism of the character described, the combination with a valve-chest having a fluid-inlet port therefrom to the cylinder, of a ported valve member covering and having a reciprocatory movement relatively to said inlet-port, a variable cut-off slide controlling the area of said cylinder inlet-port, and means whereby the port of said valve member is maintained closed during the travel of the latter relatively to the cylinder inlet-port in one direction, and open during the travel of the same in the opposite direction, substantially as described.

2. In a valve mechanism of the character described, the combination with a valve-chest having a fluid-inlet port therefrom to the cylinder, of a ported plate covering and reciprocable over said inlet-port, a variable cut-off slide disposed between said ported plate and the cylinder inlet-port and controlling the area of the latter, and means whereby the port of said plate is maintained closed during the travel of said plate over the inlet-port and cut-off slide in one direction, and open during the travel of the plate in the opposite direction, substantially as described.

3. In a valve mechanism of the character described, the combination with a valve-chest having a fluid-inlet port therefrom to the cylinder at each end thereof, of a pair of ported plates covering and having a reciprocatory movement relatively to said inlet-ports, respectively, a pair of variable cut-off slides interposed respectively between the ported plate and the cylinder inlet-port covered thereby at each end of the cylinder and controlling the areas of said cylinder inlet-ports, and means whereby the port of one of said plates is maintained closed and the port of the other open during the simultaneous travel of said plates relatively to their respective cylinder inlet-ports in one direction, and the condition of said ports is reversed during the simultaneous travel of said parts in the opposite direction, substantially as described.

4. In a valve mechanism of the character described, the combination with a valve-chest having a fluid-inlet port therefrom to the cylinder at each end thereof, of a pair of valve-plates covering and reciprocable over said inlet-ports, respectively, said valve-plates being provided with ports of less cross-sectional area than said fluid-inlet ports, a valve-actuating rod reciprocable through the valve-chest connected to and actuating both of said ported valve-plates, ported oscillatory valve-bodies carried by said plates, respectively, and adapted to alternately register with and cut off the ports of said plates, and coöperating cam members on said valve-bodies and the walls of the valve-chest whereby said valve-bodies are simultaneously and oppositely operated at each movement of the ported plates carrying the same, substantially as described.

5. In a valve mechanism of the character described, the combination with a cylinder and exhaust-valves therefor, of a valve-chest having inlet-ports therefrom to the cylinder at each end thereof, a fluid-pressure-supply pipe for said valve-chest, a pair of ported plates covering and reciprocable over said inlet-ports, a valve-actuating rod longitudinally reciprocable through the valve-chest and connected to and simultaneously operating said plates, means carried by said plates whereby the ports thereof are simultaneously opened and closed respectively at the limit of each movement of said plates, and means actuated by the movements of the valve-actuating rod whereby said exhaust-valves are alternately opened and closed in proper relation to the opening and closing of the inlet-valves of the cylinder, substantially as described.

SAMUEL E. WEBBE.

Witnesses:
SAMUEL N. POND,
FREDERICK C. GOODWIN.